United States Patent [19]

Miwa et al.

[11] Patent Number: 4,962,693
[45] Date of Patent: Oct. 16, 1990

[54] CENTRIFUGAL BREWING TYPE COFFEE MAKER

[75] Inventors: Yoshiyuki Miwa, Aichi; Takashi Wada, Nagoya, both of Japan

[73] Assignee: Kabushiki Kaisha Toshiba, Kanagawa, Japan

[21] Appl. No.: 429,980

[22] Filed: Nov. 1, 1989

[30] Foreign Application Priority Data

Nov. 2, 1988 [JP] Japan .................................. 63-278295
Nov. 2, 1988 [JP] Japan .................................. 63-278296
Jan. 17, 1989 [JP] Japan ...................................... 1-8169
Feb. 15, 1989 [JP] Japan .................................... 1-35660

[51] Int. Cl.$^5$ ........................ A47J 31/22; A47J 31/42
[52] U.S. Cl. ........................................ 99/283; 99/286; 99/287; 99/302 C
[58] Field of Search .................. 99/279, 280, 281, 282, 99/283, 286, 287, 302 C, 307, 316; 926/433

[56] References Cited

U.S. PATENT DOCUMENTS 4,196,658  4/1980  Takagi ..................................... 99/286
4,464,982  8/1984  Leuschner ......................... 99/302 C

FOREIGN PATENT DOCUMENTS 887212  1/1962  United Kingdom .............. 99/302 C

Primary Examiner—Robert W. Jenkins
Attorney, Agent, or Firm—Philip M. Shaw, Jr.

[57] ABSTRACT

A coffee maker of the centrifugal brewing type includes a brewing case for containing milled coffee beans, the brewing case having a filter provided at the outer periphery thereof for the coffee brewing, a hot water feed mechanism for feeding hot water to the brewing case, an electric motor for rotating the brewing case so that a centrifugal force is applied to the hot water fed into the brewing case, thereby causing the hot water to pass through the milled coffee beans and then, through the filter, and control circuitry for controlling the hot water feed mechanism and the motor so that the motor is driven to rotate the brewing case after the hot water feed is initiated from the hot water feed mechanism to the brewing case.

10 Claims, 4 Drawing Sheets

| | STEP | MILLING | BREWING |
|---|---|---|---|
| MOTOR | FORWARD ROTATION | ▨ | |
| | REVERSE ROTATION | | ▨ |
| | HEATER | | ▨ |

CENTRIFUGAL BREWING TYPE COFFEE MAKER

BACKGROUND OF THE INVENTION

This invention relates to coffee makers for centrifugally brewing coffee by rotating a brewing case containing milled coffee beans at high speed by a motor with hot water simultaneously fed to the brewing case from a hot water feed mechanism.

Coffee makers of the type described above are suitable for preparing "espresso"-like coffee and disclosed in Japanese Laid-open Utility Model Application No. 63-37142 and German Patent No. DE 3137651 A1. A brewing case for containing milled coffee beans is provided above an electric motor and a small space is defined between the upper peripheral edge of the brewing case and a lid closing the upper open end of the brewing case. The brewing case is rotated at high speed by the motor so that a centrifugal force due to rotation causes hot water to quickly pass through the milled coffee beans and then through the small space between the case and the lid, thereby making coffee. This coffee brewing manner is advantageous in that coffee is quickly made. Further, since a period during which the hot water is in contact with the milled coffee beans is relatively short, ingredients degrading flavor of coffee such as the ingredient of bitterness are not extracted from the milled coffee beans, thereby improving the flavor of coffee.

In the coffee maker disclosed in Japanese Laid-open Utility Model Application No. 63-37142, a heating case is provided below the brewing case for heating the water therein. A hot water feed tube is extended downwardly from the central bottom of the brewing case to the interior of the heating case. After the hot water is made in the heating case, the brewing case and the hot water feed tube are together rotated at high speed, whereby the hot water in the heating case is sucked to the brewing case through the hot water feed tube. Consequently, the hot water supply to the brewing case necessarily starts after the start of rotation of the brewing case. When the hot water supply starts after the start of rotation of the brewing case, a centrifugal force acts on the hot water supplied to the brewing case rotating at high speed from the first of the hot water feed and consequently, the hot water is caused to splash around ununiformly. Accordingly, at the first of the hot water supply to the brewing case, some part of the milled coffee beans in the brewing case includes hot water and some does not, which unbalances the brewing case. When the brewing case is rotated at high speed in the unbalanced state, the case is caused to intensely oscillate, producing a big noise.

The coffee maker disclosed in the above-mentioned German Patent is not provided with a hot water feed mechanism and accordingly, a user needs to supply hot water with a kettle or the like. Therefore, a lot of time is needed for the making of coffee and the usability is reduced.

SUMMARY OF THE INVENTION

Therefore, an object of the present invention is to provide a centrifugal brewing type coffee maker wherein the oscillation of the brewing case with high speed rotation thereof at a brewing step can be reduced and the noise reduction can be enhanced.

The present invention provides a coffee maker comprising a brewing case for containing milled coffee beans, the brewing case having a filter provided at the outer periphery thereof for coffee brewing, a hot water feed mechanism including a heater, the hot water feed mechanism feeding hot water to the brewing case, an electric motor provided for rotating the brewing case so that a centrifugal force is applied to the hot water fed into the brewing case, thereby causing the hot water to pass through the milled coffee beans and then, through the filter, and control means for controlling the hot water feed mechanism and the motor so that the motor is driven to rotate the brewing case after the hot water feed is initiated from the hot water feed mechanism to the brewing case.

The hot water is uniformly permeated into the milled coffee beans in the brewing case before the brewing case is rotated, thereby balancing the brewing case. Consequently, oscillation of the brewing case during rotation may be effectively reduced. Additionally, since the hot water is automatically fed to the brewing case by the hot water feed mechanism, a user is not troubled for the hot water feed.

It is preferable that the hot water feed mechanism include a hot water outlet disposed above the brewing case so that the hot water is fed to the brewing case from above the same. This arrangement of the outlet of the hot water feed mechanism is advantageous in that the hot water feed may be facilitated.

It is preferable that the control means control the hot water feed mechanism and the motor so that the motor is driven to rotate the brewing case after substantially the entire milled coffee beans in the brewing case is wetted with the hot water fed by the hot water feed mechanism. The reason for this is that should the milled coffee beans include wet and unwet parts, the unwet milled coffee beans adheres to the wet milled coffee beans into lumps of milled coffee beans, which unbalances the brewing case. Furthermore, the motor may be driven to rotate the brewing case after the hot water is fed to the brewing case and reserved therein. When the hot water is reserved in the brewing case, the entire milled coffee beans is necessarily immersed in the hot water such that the brewing case keeps its balance or balanced.

The coffee maker may include detecting means for detecting a timing of rotating the brewing case, thereby generating a detection signal. Based on the detection signal, the control means may control the motor so that the brewing case is rotated. Provision of the detecting means is advantageous in that the timing of starting the rotation of the brewing case ma be accurately determined.

The invention may also be practiced by a coffee maker comprising a brewing case for containing milled coffee beans, the brewing case having a filter provided at the outer periphery thereof for coffee brewing, a coffee mill rotatably mounted in the brewing case for milling coffee beans, a hot water feed mechanism including a heater, the hot water feed mechanism feeding hot water to the brewing case, an electric motor provided for driving the mill in a milling step and the brewing case in a brewing step, and a clutch mechanism for selectively transmitting rotation of the motor either to the brewing case or the mill, the clutch mechanism transmitting rotation of the motor to the mill in the milling step, the clutch mechanism transmitting rotation of the motor to the brewing case in a brewing step so that the brewing case is rotated such that a centrifugal force is applied to the hot water fed into the brewing case, thereby causing the hot water to pass through the milled coffee beans and then, through the filter.

When coffee beans are contained in the brewing case, the motor is driven. Rotation of the motor is transmitted through the clutch mechanism to the coffee mill, which is driven to mill the coffee beans. After completion of the milling step, the brewing step is initiated by feeding hot water from the hot water feed mechanism into the brewing case containing milled coffee beans. Rotation of the motor is then transmitted through the clutch mechanism to the brewing case, thereby rotating the brewing case. A centrifugal force due to rotation is applied to the hot water fed into the brewing case so that the hot water passes through the milled coffee beans and then, the filter provided on the outer periphery of the brewing case.

A single brewing case may be utilized for both of the milling and brewing operations and a single motor is utilized for selectively rotating the mill and brewing case, thereby facilitating simplified construction of the coffee maker and compactness of its size. Consequently, the coffee maker of the invention is advantageous when applied to household coffee makers.

The motor may be driven to rotate the brewing case after the hot water feed is initiated from the hot water feed mechanism to the brewing case. The hot water is uniformly permeated into the milled coffee beans in the brewing case before the brewing case is rotated, thereby balancing the brewing case. Consequently, oscillation of the brewing case during rotation may be effectively reduced. Additionally, since the hot water is automatically fed to the brewing case by the hot water feed mechanism, a user is not troubled for the hot water feed.

It is preferable that the clutch mechanism have the construction of a one-way clutch and that the motor be rotated in the milling step in the direction opposite to that in the brewing step. The construction of the clutch mechanism may be simplified, which contributes reduction of the production cost of the coffee maker. Furthermore, it is preferable that the motor be rotated in the brewing step at the speed lower than that in the milling step. The reason for this is that since the external diameter is larger than that of the coffee mill, necessary peripheral speed may be ensured even when the motor speed is reduced, thereby causing a centrifugal force necessary for the coffee brewing. In this respect, the noise due to oscillation of the brewing case may be reduced during the brewing step when the motor speed is reduced.

The invention may be further practiced by a coffee maker comprising a base, a brewing case provided at the upper portion of the base for containing milled coffee beans, the brewing case having a filter provided at the outer periphery thereof for coffee brewing, a coffee mill rotatively mounted in the brewing case for milling coffee beans, an electric motor provided at the lower side of the base for driving the mill in a milling step and the brewing case in a brewing step, a water reservoir provided at one side of the base for reserving water, a hot water feed mechanism including an electric heater and a heating pipe provided at the lower side of the base, the hot water feed mechanism making hot water from the water supplied from the water reservoir, the hot water feed mechanism feeding the hot water to the brewing case, a clutch mechanism provided between the brewing case and mill and the motor for transmitting rotation of the motor to the mill in the milling step, the clutch mechanism transmitting rotation of the motor to the brewing case in the brewing step so that the brewing case is rotated such that a centrifugal force is applied to the hot water fed into the brewing case thereby causing the hot water to pass through the milled coffee beans and then, through the filter, a collector case provided around the brewing case for receiving coffee fluid having passed through the filter, the collector case having an outlet, and a receiver provided beneath the outlet of the collector case for receiving coffee fluid falling through the outlet of the collector case.

The above-described construction may provide reasonable arrangements of the brewing case, motor, reservoir, and receiver, thereby facilitating compactness of the household coffee maker.

Other objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENT

Figure 1:
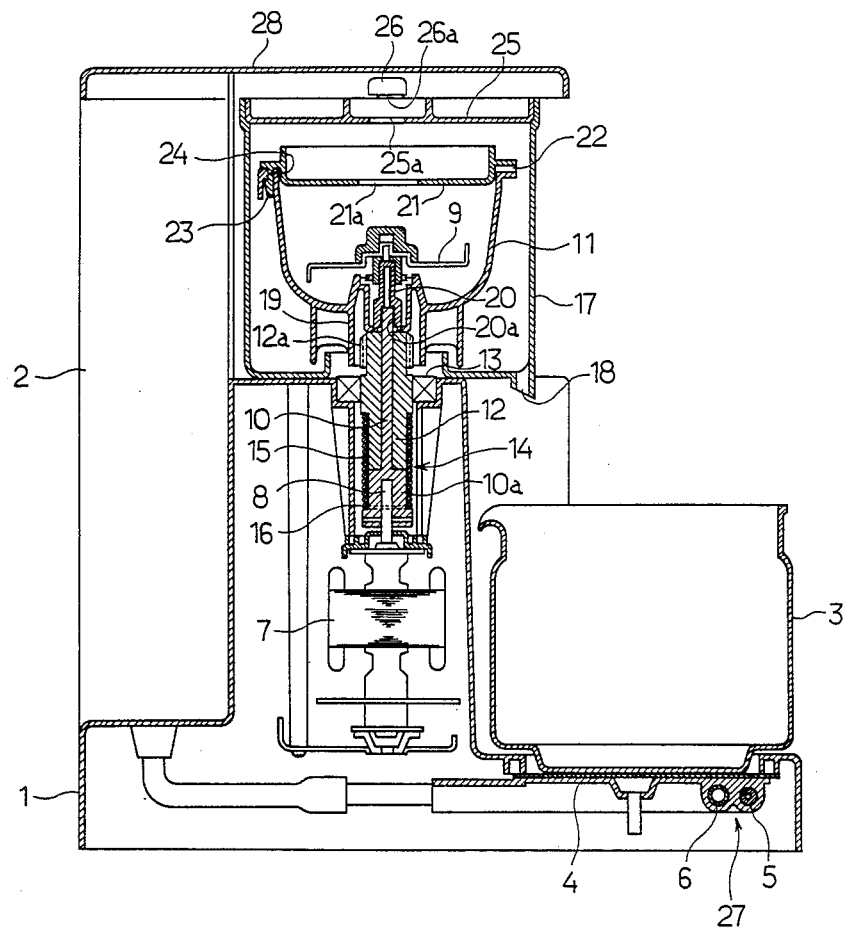
FIG. 1 is a longitudinal cross section of a coffee maker of an embodiment in accordance with the invention.

Referring now to FIG. 1 of the drawings, a coffee maker embodying the invention comprises a base 1. A cartridge type water reservoir 2 is disposed on the left side of the base 1 and a hot plate 4 is provided on the lower right-hand side of the base 1, on which plate a receiver 3 for reserving coffee fluid is placed. An electric heater 5 and a heating tube 6 are provided on the underside of hot plate 4. Water in reservoir 2 is supplied to the heating tube 6. An electric motor 7 of a vertical shaft type is provided between reservoir 2 and receiver 3. Motor 7 is specifically a commutator motor forward and reverse rotated. An inner shaft 10 for driving a coffee mill 9 described later is vertically secured to an upper end of an upwardly extended rotational shaft 8 of motor 7. A hollow outer shaft 12 for rotating a brewing case 11 described later is fitted with inner shaft 10 for relative rotation. Outer shaft 12 is rotatably mounted on a bearing 13 provided with sealing function. A clutch mechanism 14 is provided for selectively transmitting the rotation of motor 7 to outer shaft 12. Clutch mechanism 14 comprises a coil spring wound around a lower end large diameter portion 10a of inner shaft 10 and the lower portion of outer shaft 12 and the lower end of coil spring 15 is secured to lower end large diameter portion 10a of inner shaft 10 by a lock pin 16. Clutch mechanism 14 is constructed as a frictional one-way clutch. Therefore, coil spring 15 is wound off against outer shaft 12 during the forward rotation of motor 7 with the result that rotation of motor 7 is not transmitted to outer shaft 12, with only inner shaft 10 rotated. When motor 7 is reverse rotated, a frictional force causes coil spring 15 to wind up against outer shaft 12, thereby rotating both shafts 10 and 12 together.

Figure 2:
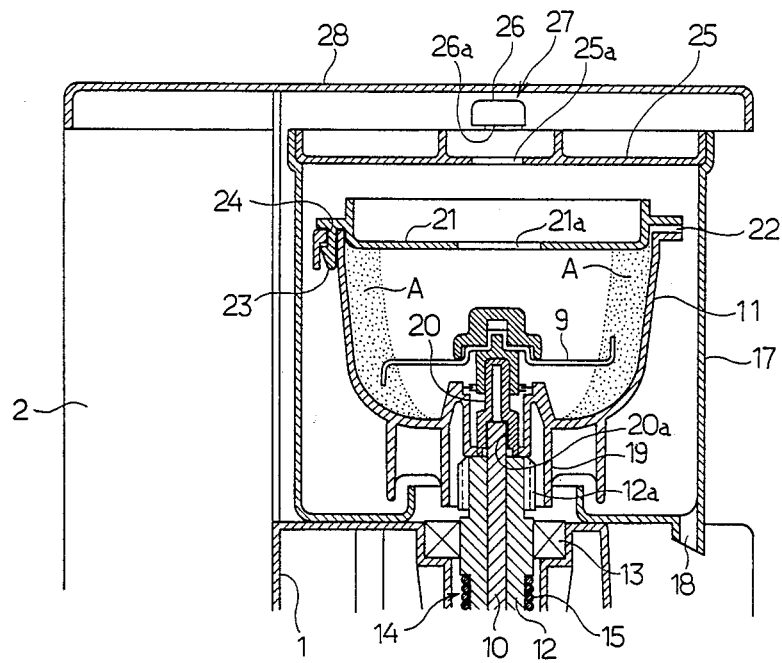
FIG. 2 is an enlarged longitudinal cross section of a brewing case and its surrounding portion of the coffee maker.

A collector case 17 is detachably provided above clutch mechanism 14. Collector case 17 has an outlet 18 formed through the right-hand end of a bottom wall thereof, as viewed in FIGS. 1 and 2. Outlet 18 of collector case 17 faces an upper opening of receiver 3. A brewing case 11 utilized for both of milling and brewing operations is enclosed in collector case 17. As seen in FIG. 2, brewing case 11 has an annular joint 19 formed on the bottom thereof and downwardly extended. An upper end coupling portion 12a of outer shaft 12 is fitted in with joint 19, thereby holding brewing case 11 in position. The inner peripheral surface of joint 19 and the outer peripheral surface of coupling portion 12a of outer shaft 12 are formed so as to have a concave and convex relationship to each other, thereby preventing simultaneous rotation of them. A mill 9 is rotatably mounted in brewing case 11. Mill 9 has a coupling opening 20a formed under a shaft 20 thereof, to which opening the upper end of inner shaft 10 is coupled.

Brewing case 11 has an upper opening covered by a lid 21 having a central opening 21a through which hot water falls down into brewing case 11. A space having the width of, for example, approximately 0.2 mm is defined between brewing case 11 and lid 21 uniformly along the entire peripheries of them. The space serves as a filter 22. Case 11 has a downwardly tapered inner surface so that the centrifugal force due to rotation causes the coffee fluid or hot water to rise toward filter 22. Lid 21 has an engagement claw 23 which is engaged with a bayonet engagement groove 24 formed in the upper edge portion of brewing case 11, thereby fixing lid 21 to brewing case 11. Collector case 17 also has an upper open end covered by another lid 25 having a central opening 25a through which hot water falls down onto lid 22. A hot water feed arm 26 is provided above lid 25 so as to be horizontally pivoted. Hot water feed arm 26 is communicated to heating pipe 6 and has an outlet 26a positioned right above opening 25a. Hot water feed arm 26, heating pipe 6 and heater 5 constitute a hot water feed mechanism 27. A cover 28 covers the upper side of base 1 of the coffee maker.

Figures 3, 4:
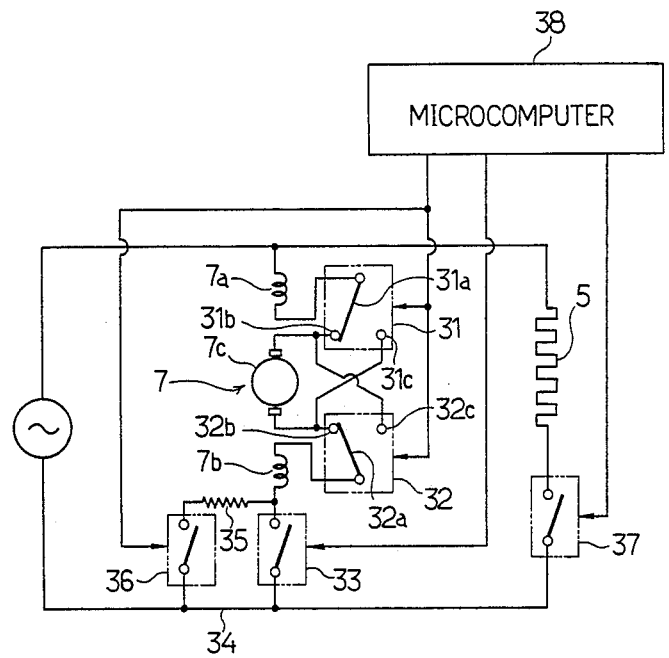
FIG. 3 is a circuit diagram for controlling a motor and a heater in the coffee maker.
FIG. 4 is a time chart illustrating operations of the motor and the heater.

An electrical circuit arrangement of the coffee maker will now be described with reference to FIG. 3. Two switches 31 and 32 are provided for reversing the flow of an electrical current to field coils 7a and 7b and an armature coil 7c of motor 7. Further, a switch 33 for forward rotation is connected between field coil 7b and a power line 34 and a series circuit of a resistance 35 and a switch 36 for reverse rotation is connected in parallel with forward rotation switch 33. In the coffee beans milling step, a movable contact 31a of switch 31 is engaged with a fixed contact 31b thereof and a movable contact 32a of switch 32 is engaged with a fixed contact 32b thereof. Further, forward rotation switch 33 is turned on for execution of the milling step. Consequently, motor 7 is forward rotated at 10,000 rpm, for example. On the other hand, in the brewing step, movable contact 31a of switch 31 is switched to a fixed contact 31c thereof and movable contact 32a of switch 32 is switched to a fixed contact 32c. Further, reverse rotation switch 36 is turned on, with the result that motor 7 is reverse rotated at 5,000 rpm, for example. The motor revolution in the reverse rotation is decreased to a half of that in the forward rotation because resistance 35 reduces the voltage applied to motor 7. A heater switch 37 is provided in a power line thereto. Switching operations of switches 31, 32, 33, 36 and 37 are controlled by a microcomputer 38 serving as control means. After completion of the milling step, microcomputer 38 operates to energize heater 5 (or to turn on heater switch 37) for making of hot water. The timing for reversing the motor rotation is set in microcomputer 38 so that motor 7 is reverse rotated (or switch 36 is turned on) when substantially the entire milled coffee beans is permeated with the hot water fed into brewing case 11. In the embodiment, the timing for reversing the motor rotation is determined by a timer which starts the time-counting operation simultaneously with the start of energization of heater 5. Motor 7 is reverse rotated at the time when the timer accumulated period reaches a predetermined period previously obtained by an experiment. FIG. 4 illustrates the relationship between the directions of motor rotation and an energization period of heater 5.

The operation of the coffee maker will now be described. First, a certain amount of water is supplied to reservoir 2 and a corresponding amount of coffee beans is contained in brewing case 11, reservoir 2 and brewing case 11 being set as shown in FIG. 1. Then, when a switch (not shown) is operated in order that the milling step is initiated, microcomputer 38 operates so that movable contact 31a of switch 31 is engaged with fixed contact 31b and so that movable contact 32a of switch 32 is engaged with fixed contact 32b. Microcomputer 38 further operates to turn on forward rotation switch 33 so that motor 7 forward rotates at 10,000 rpm, for example. Consequently, mill 9 is driven to mill the coffee beans in brewing case 11. In the milling step, motor 7 rotates in the same direction that coil spring 15 of clutch mechanism 14 is wound off against outer shaft 12. Accordingly, rotation of motor 7 is not transmitted to outer shaft 12, with the result that brewing case 11 is stationary in the milling step.

The above-described milling operation is executed for a predetermined period, for example, for 30 to 40 seconds. Then, microcomputer 38 operates to turn off forward rotation switch 33 to temporally deenergize motor 7. Subsequently, heater switch 37 is turned on so that heater 5 is energized, whereby the water fed to heating pipe 6 from reservoir 2 is sequentially heated, thereby obtaining hot water. The boiling pressure raises the hot water to hot water feed arm 26 sequentially. The hot water fed to feed arm 26 is then fed into brewing case 11 through outlets 25a and 21a of respective lids 25 and 21. Thereafter, when substantially the entire milled coffee beans in brewing case 11 is wetted with the hot water, microcomputer 38 operates to engage movable contact 31a of switch 31 with fixed contact 31c and to engage movable contact 32a of switch 32 with fixed contact 32c. Microcomputer 38 further operates to turn on reverse rotation switch 36. Consequently, motor 7 reverse rotates at 5,000 rpm, for example. Since motor 7 rotates in the direction that coil spring 15 of clutch mechanism 14 is wound up, coil spring 15 is wound up against the outer periphery of outer shaft 12, whereby rotation of motor 7 is transmitted to outer shaft 12 as well as inner shaft 10. Inner and outer shafts 10 and 12 are thus rotated together such that brewing case 11 is rotated at high speed with mill 9. Since some hot water is already fed in brewing case 11 before rotation thereof, the hot water uniformly permeates the entire milled coffee beans in brewing case 11, thereby balancing brewing case 11 Consequently, even when brewing case 11 starts rotating, almost no oscillation of brewing case 11 occurs, which contributes to stabilize the motor rotation in the rise period. Upon rotation of brewing case 11, a centrifugal force due to rotation causes milled coffee beans A in brewing case 11 to uniformly disperse to the peripheral wall side, as shown in FIG. 2. Consequently, milled coffee beans A uniformly sticks to the peripheral wall inner surface with the result that a uniform layer of milled coffee beans A is formed along the peripheral wall inner surface. In this state, the hot water is discharged from feed arm 26 toward the inner central portion of brewing case 11 to be thereby received by mill 9 and inner bottom of brewing case 11. Rotation of mill 9 shakes off the hot water received by the mill in the direction that the centrifugal force acts and consequently, the hot water is dispersed around to thereby permeate coffee ground A from the inner peripheral side. Furthermore, the centrifugal force due to rotation of brewing case 11 causes the hot water received by the inner bottom thereof to permeate milled coffee beans A through the brewing case inner bottom surface. The hot water having thus permeated milled coffee beans A passes therethrough relatively promptly owing to the centrifugal force with coffee ingredients extracted and reaches the inner surface of the brewing case peripheral wall. The hot water containing coffee ingredients is further caused to rise along the tapered inner peripheral wall surface and disperse around from filter 22 to be thereby received by the inner peripheral wall of collector case 17. The coffee fluid thus received by the inner peripheral wall of collector case 17 flows downward along the wall, falling downward from outlet 18 into receiver 3. Since the centrifugal force due to rotation of brewing case 11 causes the hot water to pass through milled coffee beans A relatively promptly, only essential fragrant ingredients are extracted and those degrading the flavor of coffee are not extracted, thereby improving the coffee flavor.

As obvious from the foregoing description, brewing case 11 is rotated after the hot water feed to the brewing case is initiated. Accordingly, brewing case 11 is stationary at an initial stage of the hot water feed and the hot water uniformly permeates the entire milled coffee beans in brewing case 11, with the result that brewing case 11 is balanced. Consequently, rotation of brewing case 7 may be stabilized from the first, thereby reducing oscillation due to the unbalanced state of brewing case 11 and reducing the noise. Additionally, since the hot water feed to brewing case 11 is automatically performed, coffee may be easily made without trouble of a user.

Should the hot water feed be initiated before the start of rotation of brewing case 11, it would be considered that the noise due to oscillation of brewing case 11 is reduced. However, in order to achieve remarkable noise reduction effect, motor 7 is preferably started to drive brewing case 11 after the hot water feed by hot water feed mechanism 27 is initiated such that the entire milled coffee beans in brewing case 11 is wetted with the hot water. The reason for this is that should the milled coffee beans include wet and unwet parts, the unwet milled coffee beans adheres to the wet milled coffee beans into lumps of milled coffee beans, which unbalances the brewing case. Furthermore, motor 7 may be driven to rotate brewing case 11 after the hot water is fed to brewing case 11 to be reserved therein. When the hot water is reserved in the brewing case, the entire milled coffee beans is necessarily permeated with the hot water such that the brewing case keeps its balance or balanced.

Mill 9 is rotatably mounted in brewing case 11 and clutch mechanism 14 is provided for selectively transmitting rotation of motor 7 to brewing case 11 and mill 9. Consequently, a single brewing case may be utilized for both of the milling and brewing operations and a single motor as a drive source may be employed for driving mill 9 and brewing case 11. Consequently, the invention provides a coffee maker simple in construction and compact in size and the coffee maker of the invention is advantageous when applied to a house hold coffee maker.

Clutch mechanism 14 has the construction of a one-way clutch and motor 7 may be forward and reverse rotated. Consequently, mill 9 and brewing case 11 may be selectively rotated. Further, since the construction of clutch mechanism 14 is simplified, the production cost of the coffee maker may be reduced. Additionally, although the one-way clutch comprises coil spring 15 in the foregoing embodiment, a sprag clutch or other type one-way clutches may be employed. Moreover, the clutch mechanism is not limited to the one-way clutches. For example, an electromagnetic clutch, a conical friction clutch, a disc clutch or the like may be employed. In each of these clutches, the clutch is operated before the start of the brewing step so that brewing case is driven. The motor is not needed to change its direction of rotation.

Since the motor is driven in the brewing step at the speed lower than that in the milling step, the noise due to oscillation may be reduced in the brewing step. Although the motor speed is decreased in the brewing step, a sufficient peripheral speed of brewing case 11 may be ensured since the outer diameter of the brewing case is larger than that of mill 9, thereby ensuring a sufficient centrifugal force for the coffee brewing.

Figure 5:
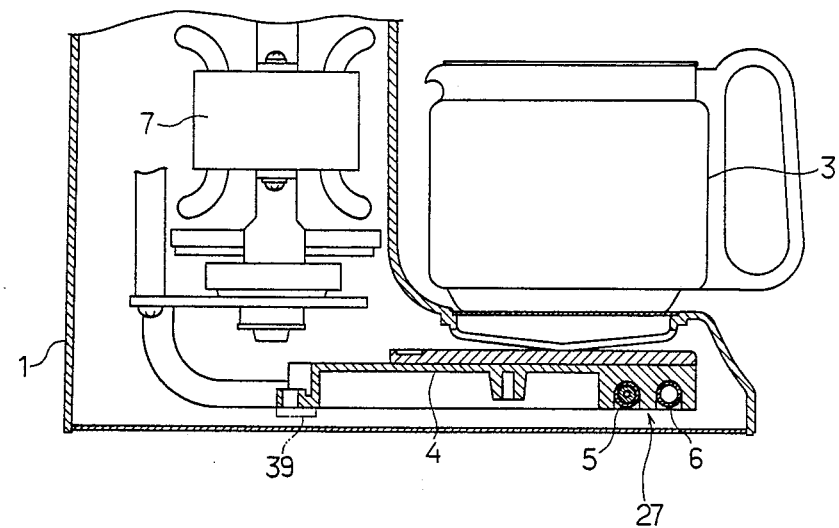
FIG. 5 is a longitudinal cross section of the lower base section of a coffee maker of a second embodiment.
Figure 6:
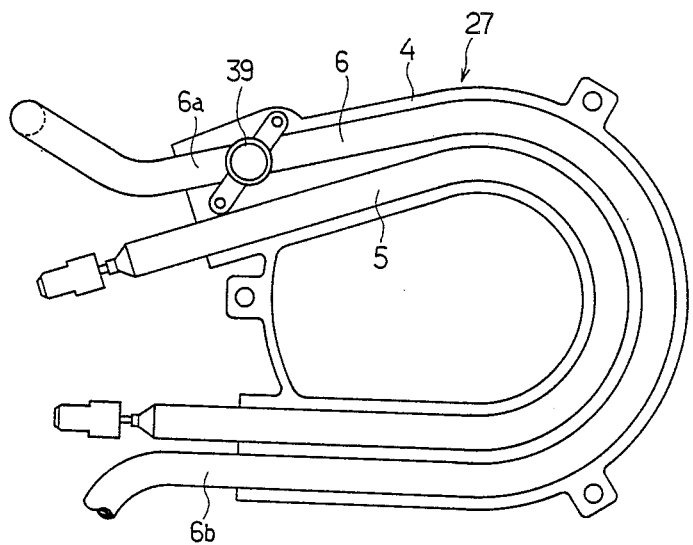
FIG. 6 is a bottom view of a hot water feed mechanism of the coffee maker of the second embodiment.

Although the rotation timing of brewing case 11 is determined by the timer which starts the time-counting operation simultaneously with the start of energization of heater 5, detecting means may be provided for detecting the rotation timing of brewing case 11, instead. When detecting the rotation timing of brewing case 11, the detecting means generates a detection signal, which is supplied to microcomputer 38. Upon receipt of the detection signal, microcomputer 38 operates to drive brewing case 11. More specifically, a thermistor 39 may be employed as such detecting means, as shown in FIGS. 5 and 6. Thermistor 39 is disposed on a portion 6a of heating tube 6 at the reservoir or water inlet side. Thermistor 39 detects the temperature of heating tube 6 to thereby generate a detection signal, which is supplied to microcomputer 38. When the temperature detected by thermistor 39 reaches a predetermined temperature at which the hot water feed to brewing case 11 is initiated, microcomputer 38 operates so that motor 7 is reverse rotated to drive brewing case 11. Provision of the detecting means such as thermistor 35 is advantageous in that the rotation timing of brewing case 11 may be accurately determined independent of the temperature of water in reservoir 2. Alternatively, motor 7 may be reverse rotated with a predetermined delay period when the temperature detected by thermistor 39 reaches the predetermined temperature. The reason for the disposition of thermistor 39 on portion 6a of heating tube 6 at the reservoir side is that thermistor 39 also serves to detect completion of hot water feed to brewing case 11. More specifically, when the water in reservoir 2 is all fed and the heating tube 6 is dried up, the temperature of heating tube is rapidly increased The rapid temperature increase is detected by thermistor 39, thereby accurately determining the completion of hot water feed. Heater 5 may be deenergized upon completion of hot water feed. The position of thermistor 39 is not limited to that described above. It may be disposed on a portion 6b of heating tube 6 at the outlet side or on hot water feed arm 26.

Instead of thermistor 39, a weight sensor may be provided for measuring the weight of brewing case 11. The rotation timing of brewing case 11 may be determined based on changes of weight of brewing case 11 measured by weight sensor. Furthermore, a flowmeter may be mounted on hot water feed arm 26 for detecting the flow rate of hot water and the rotation timing of brewing case 11 may be determined based on changes of the detected flow rate.

A number of small perforations may be formed in the entire peripheral wall of brewing case 11 so as to serve as the filter. Additionally, the coupling structure between inner and outer shafts 10, 12 and mill 9 and brewing case 11 may be changed.

The foregoing disclosure and drawings are merely illustrative of the principles of the present invention and are not to be interpreted in a limiting sense. The only limitation is to be determined from the scope of the appended claims.

What we claim is:

1. A coffee maker comprising:
   (a) a brewing case for containing milled coffee beans, the brewing case having a filter provided at the outer periphery thereof for coffee brewing;
   (b) a hot water feed mechanism including a heater, the hot water feed mechanism feeding hot water to the brewing case;
   (c) an electric motor provided for rotating the brewing case so that a centrifugal force is applied to the hot water fed into the brewing case, thereby causing the hot water to pass through the milled coffee beans and then, through the filter; and
   (d) control means for controlling the hot water feed mechanism and the motor so that the motor is driven to rotate the brewing case after the hot water feed is initiated from the hot water feed mechanism to the brewing case.

2. A coffee maker according to claim 1, wherein the hot water feed mechanism includes a hot water outlet disposed above the brewing case so that the hot water is fed to the brewing case from above the same.

3. A coffee maker according to claim 1, wherein the control means controls the hot water feed mechanism and the motor so that the motor is driven to rotate the brewing case after substantially the entire milled coffee beans in the brewing case is permeated with the hot water fed by the hot water feed mechanism.

4. A coffee maker according to claim 1, wherein the control means controls the hot water feed mechanism and the motor so that the motor is driven to rotate the brewing case after an amount of hot water from the hot water feed mechanism is collected in the brewing case.

5. A coffee maker according to claim 1, which further comprises detecting means for detecting a timing of rotating the brewing case, thereby generating a detection signal and wherein based on the detection signal, the control means controls the motor so that the brewing case is rotated.

6. A coffee maker comprising:
   (a) a brewing case for containing milled coffee beans, the brewing case having a filter provided at the outer periphery thereof for coffee brewing;
   (b) a mill rotatably mounted in the brewing case for milling coffee beans;
   (c) a hot water feed mechanism including a heater, the hot water feed mechanism feeding hot water to the brewing case;
   (d) an electric motor provided for driving the mill in a milling step and the brewing case in a brewing step;
   (e) a clutch mechanism for selectively transmitting rotation of the motor either to the brewing case or the mill, the clutch mechanism transmitting rotation of the motor to the mill in a milling step, the clutch mechanism transmitting rotation of the motor to the brewing case in a brewing step so that the brewing case is rotated such that a centrifugal force is applied to the hot water fed into the brewing case, thereby causing the hot water to pass through the milled coffee beans and then, through the filter.

7. A coffee maker according to claim 6, wherein the motor is driven to rotate the brewing case after the hot water feed is initiated from the hot water feed mechanism to the brewing case.

8. A coffee maker according to claim 6, wherein the clutch mechanism has the construction of a one-way clutch and wherein the motor is rotated in the milling step in the direction opposite to that in the brewing step.

9. A coffee maker according to claim 6, wherein the motor is rotated in the brewing step at the speed lower than that in the milling step.

10. A coffee maker comprising:
    (a) a base;
    (b) a brewing case provided at the upper portion of the base for containing milled coffee beans, the brewing case having a filter provided at the outer periphery thereof for coffee brewing;
    (c) a mill rotatably mounted in the brewing case for milling coffee beans;
    (d) an electric motor provided at the lower side of the base for driving the mill in a milling step and the brewing case in a brewing step;
    (e) a water reservoir provided at one side of the base for reserving water;
    (f) a hot water feed mechanism including an electric heater and a heating pipe provided at the lower side of the base, the hot water feed mechanism making hot water from the water supplied from the water reservoir, the hot water feed mechanism feeding the hot water to the brewing case;
    (g) a clutch mechanism provided between the brewing case and mill and the motor for transmitting rotation of the motor to the mill in the milling step, the clutch mechanism transmitting rotation of the motor to the brewing case in the brewing step so that the brewing case is rotated such that a centrifugal force is applied to the hot water fed into the brewing case, thereby causing the hot water to pass through the milled coffee beans and then, through the filter;
    (h) a collector case provided around the brewing case for receiving coffee fluid having passed through the filter, the collector case having an outlet; and
    (i) a receiver provided beneath the outlet of the collector case for receiving coffee fluid falling through the outlet of the collector case.

* * * * *